July 23, 1935.  R. H. MAYO  2,009,296
COMPOSITE AIRCRAFT
Filed Oct. 9, 1933   2 Sheets-Sheet 1

July 23, 1935.  R. H. MAYO  2,009,296
COMPOSITE AIRCRAFT
Filed Oct. 9, 1933  2 Sheets-Sheet 2

Robert Hobart Mayo
Inventor
By

Patented July 23, 1935

2,009,296

UNITED STATES PATENT OFFICE 2,009,296

COMPOSITE AIRCRAFT

Robert Hobart Mayo, London, England

Application October 9, 1933, Serial No. 692,890
In Great Britain April 27, 1933

13 Claims. (Cl. 244—2)

This invention relates to means for launching aircraft, the particular purpose of the invention being to provide means enabling an aircraft to be launched at such speed and at such altitude as to ensure the safe continuation of its flight, without it first having to attain the necessary minimum flying speed by taxying over land or water or by being catapulted into the air. The invention is more especially applicable to the launching of aircraft of high wing loading and high minimum flying speed, but may be applied to any class of aircraft, or to the launching of an aircraft at a considerable distance from its base thus increasing its effective range.

The invention relates more particularly to composite aircraft of the kind comprising two component aircraft each capable of separate flight mounted one on top of the other and initially connected together by locking means which enable the composite aircraft to take off fly and land as a single unit, but which are releasable when the composite aircraft is in flight to enable separation of the two components to take place. The object of the invention is to provide in such composite aircraft means for preventing separation of the two components unless and until the upper component has sufficient lift to ensure that when detached it will lift clear of the lower component in sustained and controlled independent flight. The invention is applicable to composite aircraft in which either component is of land, marine or amphibian type.

In my earlier United States Patent No. 1,925,768 Serial No. 661,157 filed 16th March 1933 I have described various means for ensuring the safe separation of the two components of a composite aircraft, an essential feature of the invention described in that application being that separation of the components is effected only after increasing the lift coefficient of the wings of the upper component relatively to that of the wings of the lower component during flight of the composite aircraft as such. The present invention however does not relate to composite aircraft of the kind in which some special control is provided for increasing the lift coefficient of the wings of the upper component relatively to that of the wings of the lower component during flight until the lift on the upper component reaches a launching value sufficient to ensure safe separation of the components on release of the locking means. On the contrary, the present invention relates exclusively to composite aircraft in which, as the composite aircraft accelerates, the lift on the wings of the upper component increases automatically until it reaches the safe launching value, and the invention resides essentially in providing, in such composite aircraft, means for ensuring that the components must remain safely locked together until the lift on the wings of the upper component has in fact attained the launching value necessary for safe separation.

According to a feature of the invention the locking means may comprise a locking device arranged to be released only by the combined or consecutive operation of controls located in both components. Again, the locking means may comprise a locking device arranged to release automatically when the lift on the wings of the upper component reaches the predetermined launching value.

According to a further feature of the invention the detachment of the upper component from the lower component may be made dependent upon the final release of a single attachment between the two components. In accordance with this principle the components may be attached together by three automatically releasing locking devices one on either side of the centre line of the composite aircraft and the other disposed centrally, the side locking devices being arranged to release somewhat sooner than the central locking device. The above features of the invention, together with certain further safety devices not hitherto referred to, will now be described in detail by way of example with reference to the accompanying drawings, in which, Fig. 1 is a side elevation of a composite aircraft according to the invention;

Like references indicate like parts throughout the drawings.

Referring to the drawings in detail:—

Figure 1:
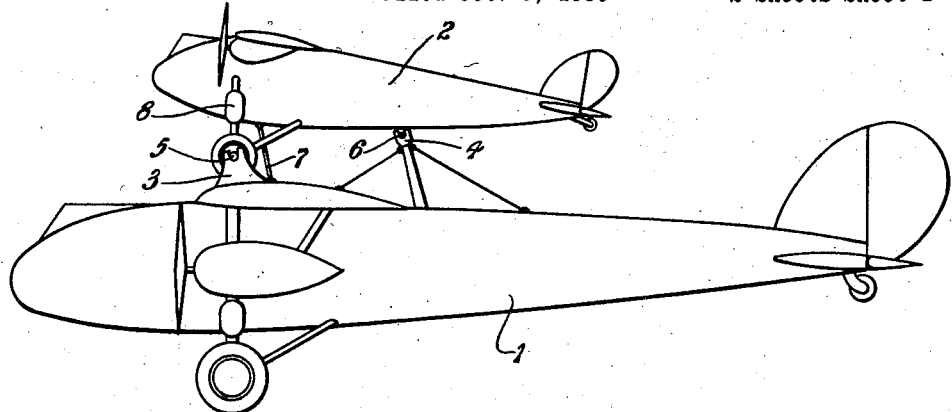

Fig. 1 shows in side elevation an example of one form of composite aircraft in accordance with the invention in which the lower component 1 has mounted on the upper surface of its wings sockets 3 in which the axles 5 of the undercarriage of the upper component 2 rest. Further aft the lower component 1 has mounted on it another socket 4 in which the pin 6 which is attached to the upper component 2 rests. The upper component 2 is held securely in the sockets 3 and the socket 4 by means of a rod or cable 7 which is initially in tension and which is arranged to be released only when the wings of the upper component 2 have sufficient lift to ensure that when the release takes place the upper component 2 will lift clear of the lower component 1 and will be able to maintain independent controlled flight. Locks or stops may be provided to prevent the functioning of the undercarriage shock-absorbers 8 while the upper component is attached to the lower component, such locks or stops being released after detachment by means of a control located in the upper component or automatically when detachment occurs.

In the example shown in Fig. 1 the attitude of the upper component relatively to that of the lower component is such that, as will readily be seen, the angle of incidence of the wings of the upper component is substantially greater than that of the wings of the lower component, so that as the composite aircraft accelerates the lift on the upper component will automatically increase relatively to that on the lower component until it reaches a safe launching value. It will, however, be understood that it is not essential that the two components should be set so that the wings of the upper component are at a substantially larger angle of incidence than that of the wings of the lower component, for it is possible, as explained in my United States Patent No. 1,974,684 Serial No. 691,865 filed October 2d, 1933 to obtain automatic increase in the lift on the upper component to the launching value as the composite aircraft accelerates, notwithstanding the fact that the two components are initially set so that their wings will be at or approximately at their angles of maximum lift at the same time, by employing for the wings of the upper component an aerofoil having an appreciably wider angular range between the angle of no lift and the angle of maximum lift than that of the aerofoil employed for the wings of the lower component.

Figure 2:
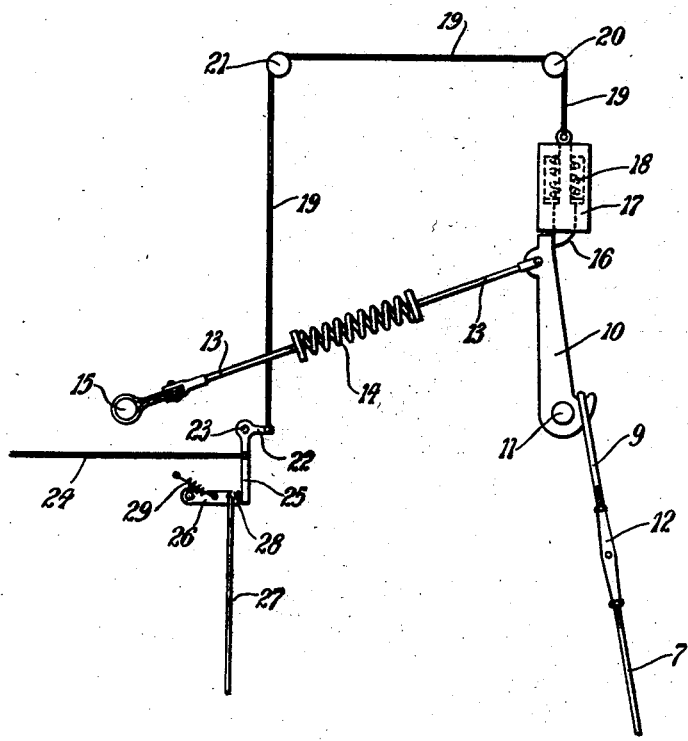
Fig. 2 is a detail view on an enlarged scale of automatic mechanism for releasing the upper component when the lift thereon reaches a predetermined limit.

Fig. 2 shows an example of mechanism in accordance with the invention by means of which the rod or cable 7 securing the two components together is released at the appropriate time. The rod or cable 7 has at its upper end an eye 9 which is initially held by the hook 10 which is pivotally mounted at 11 on the structure of the upper component. The rod or cable 7 is provided with a turnbuckle 12 by means of which it is initially tightened to the appropriate tension to ensure that the two components will remain rigidly attached together during the take-off and flight of the composite aircraft and until the rod or cable 7 is released. The upper end of the hook 10 is attached by means of the rods or cables 13 and the spring 14 to the structure of the upper component at 15. It will be seen that as the lift of the upper component increases relatively to that of the lower component the tension in the rod or cable 7 increases correspondingly and the hook 10 tends to turn about its pivot 11 against the pull of the spring 14. The hook 10 is conveniently so arranged that the tension in the rod or cable 7 has a comparatively small leverage about the fulcrum 11, while the tension in the rods or cables 13 has a comparatively large leverage about the fulcrum 11 with the result that the strength of the rods or cables 13 and the spring 14 is required to be correspondingly less than that of the rod or cable 7 connecting the two components together.

Initially the hook 10 is prevented from turning about its pivot under the influence of increased tension in the rod or cable 7 by means of a lock 16 which is arranged to slide in the housing 17 attached to the upper component. The lock 16 is initially held in position to prevent movement of the hook 10 by means of the spring 18, but attached to the top end of the lock 16 is a control cable 19 passing over the pulleys 20 and 21 and attached at its other end to the bell-crank lever 22 which is pivotally mounted at 23 on the upper component. The bell-crank lever 22 has attached to it the control cable 24 which is arranged to be operated by means of a lever etc. by the pilot or other member of the crew of the upper component. Thus when the control cable 24 is operated to pull the cable 19 by means of the bell-crank lever 22 the lock 16 is pulled into the housing 17 against the action of the spring 18. This enables the hook 10 to turn about its pivot 11 under the action of increasing tension in the rod or cable 7. Movement of the hook 10 is opposed by the spring 14, but as the tension in the rod or cable 7 increases the resistance of the spring 14 is overcome until when a certain tension is reached the hook 10 will have turned through such an angle that the eye 9 of the rod or cable 7 is automatically slipped from the hook 10 and the upper component is released from attachment to the lower component.

An example of locking means arranged to be released only by the combined or consecutive operation of controls located in both components is also shown in Fig. 2. The bell-crank lever 22 has an extension 25 of the arm to which the control cable 24 is attached. The bell-crank lever 22 is initially prevented from turning about its pivot 23 by means of a lock or trigger 26 which abuts against the end of the arm 25 of the bell-crank lever 22. The trigger 26 has a diagonal slot 28 cut in its upper surface and into this slot 28 is slipped an eye at the upper end of the control cable 27 which is arranged to be operated by the pilot or other member of the crew of the lower component. The trigger 26 is initially held in position to prevent turning of the bell-crank lever 22 by means of the spring 29. It will be seen that so long as the trigger 26 remains in position the pilot of the upper component is unable to release the lock 16 to permit of the automatic detachment of the upper component from the lower component. When, however, the pilot of the lower component operates the control cable 27 to pull the trigger 26 from engagement with the bell-crank lever 22 against the action of the spring 29, the pilot of the upper component is enabled to release the lock 16. The spring 29 is so arranged that when the trigger 26 has been pulled down to a predetermined angle the spring 29 will pass through the dead centre position and will then pull the trigger 26 round to the opposite side of its pivot so that it will not tend to re-engage with the bell-crank lever 22. The slot 28 is cut at such an angle that when the spring 29 has passed through the dead centre position the loop of the control cable 27 will automatically slip out of the slot and drop clear of the upper component.

It will be appreciated that the mechanism illustrated in Fig. 2 may take other forms following the general principles described and may be reversed in sense, that is to say, the control rod or cable 7 may be attached to the upper component and the hook 10 or its equivalent may be mounted on the lower component.

Alternatively the upper component may be prevented from leaving the lower component until the upper component has an excess of lift sufficient to ensure that immediately after detachment it will rise clear of the lower component, by providing the sockets of the one component with restraining means to prevent the axles or pins of the other component from moving out of the sockets until a certain predetermined force is applied to separate the two components.

Figure 3:
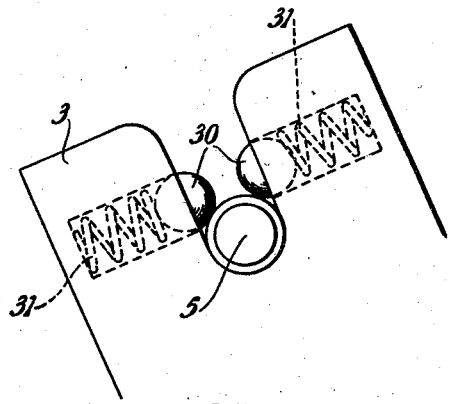
Fig. 3 is an illustration of an alternative construction of automatic release mechanism.

An example of such restraining means is shown in Fig. 3 in which the axle 5 is restrained from moving out of the socket 3 by balls or rollers 30 which are housed in recesses in the sides of the socket and held in position by springs 31. The strength of these springs is such as to ensure that the axle will not move out of the socket until a force of the desired magnitude is applied to the axle. In this way the axle will be kept in the socket until the upper component has sufficient lift to ensure its rapid separation from the lower component immediately after detachment. The restraining means may take other forms; for instance, the balls or rollers may be replaced by a spring or springs which must be pressed by the axle into a recess or recesses in the socket before the axle can get out. It will be appreciated that instead of or in addition to restraining means of the kind described, positive locking means may be provided to prevent the axles or pins of the one component from leaving the sockets of the other component until such locking means are released. For example, the socket may be provided with a locking pin which initially obstructs the socket and prevents escape of the axle therefrom, but which on operation of a suitable control may be withdrawn from its obstructing position so that the axle is free to leave the socket. Such positive locking means may be arranged to be released only by the combined or consecutive operation of controls located in both components and means may also be provided, such as those described above or hereinafter, to prevent release of said locking means until a predetermined excess lift acts on the upper component.

Figure 6:
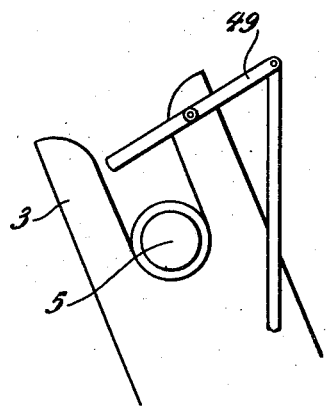
Fig. 6 illustrates a trip mechanism for throttling down and/or switching off the engines of the lower component when separation between the components takes place.

In order to prevent initial relative movement of the two components except in a predetermined direction, any or all of the sockets 3 and 4 may be made of restrictive form and attitude. Sockets of this kind are shown in Figs. 3 and 6.

Means may be provided to enable the mountings or locking means connecting together the components, or any part thereof associated with either component of the composite aircraft to be retracted into or towards the appropriate component after separation of the two components, for the purpose of reducing drag or eliminating risk of fouling with the ground when the upper component lands or is beached after landing.

Figure 4:
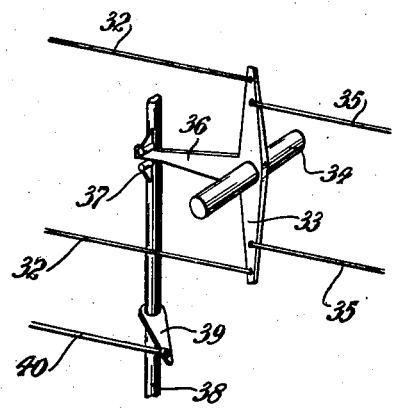
Fig. 4 illustrates mechanism for locking a flying control of one of the components.

Fig. 4 shows an example of means by which a flying control of the upper component is locked during flight of the composite aircraft. The control cables 32 are attached to the lever 33 which is rigidly mounted on the horizontal rocking shaft 34. Control cables 35 connect the lever 33 to the flying control (e. g. the elevator) of the upper component. Rigidly attached to the lever 33 is an arm 36 which is initially prevented from moving by stops 37 attached to a vertical rocking shaft 38. Rigidly mounted on the rocking shaft 38 is a lever 39 to the end of which is attached a control rod 40. It will be seen that so long as the rocking shaft 38 is kept in position so that the stops 37 prevent the arm 36 from moving the pilot of the upper component will be unable to operate the control cables 32, but when the rocking shaft 38 is turned through a right angle or more by means of the control rod 40 the stops 37 will be released from engagement with the arm 36 which will then be free to move. The pilot of the upper component will thus be enabled to operate the flying control by means of the control cables 32.

The control rod 40 may be arranged to be operated by the same control lever as that which operates the mechanism to permit of the release of the upper component from the lower component. For instance means for locking one or more of the flying controls of the upper component such as those shown in Fig. 4 may be used in conjunction with releasing mechanism such as that shown in Fig. 2. In that case the control rod 40 (Fig. 4) may conveniently be arranged to be operated by the same control lever as that which operates the control cable 24 (Fig. 2). By interconnecting the flying control locking means and the main releasing mechanism in this way the flying control or controls of the upper component will be kept locked until the pilots of the two components have taken the necessary combined or consecutive action to permit of the release of the upper component from the lower component.

Alternatively the control rod 40 (Fig. 4) may be arranged to be operated by the hook 10 (Fig. 2), in which case the flying control locking means will be automatically released as and when the upper component detaches itself from the lower component.

Figure 5:
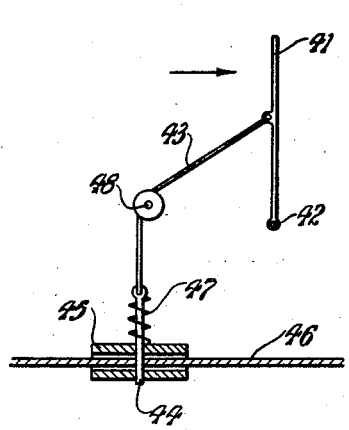
Fig. 5 shows an aerodynamically operated safety device.

Fig. 5 illustrates an aerodynamically operated safety device which renders it impossible for the safety device to be detached from the lower component until the composite aircraft has reached a predetermined air speed at which the upper component may be safely detached. This safety device comprises a vane 41 pivoted at 42 to one or other of the components of the composite aircraft. A locking pin 44 passing through a hole in the sleeve 45 and the rod 46 initially locks the rod so that it is incapable of movement in the sleeve. The rod 46 forms part of the mechanism for releasing one or more of the locking devices initially preventing detachment of the upper component from the lower component, e. g. the rod 46 may be arranged to perform the function of the control cable 24 (Fig. 2) or to actuate the control cable 27 (Fig. 2). It will be appreciated therefore that so long as the pin 44 remains in the sleeve 45 it will be impossible for the locking means securing the two components of the composite aircraft together to be released. The pin 44 is normally held in its operative position by the spring 47. The pin 44 is connected to the vane 41 by means of the cable 43 which passes around a pulley 48.

When the air speed of the composite aircraft exceeds a predetermined limit, the air pressure (in the direction of the arrow) on the vane 41 causes the latter to turn about its pivot 42 and disengage the pin 44 from the rod 46 against the action of the spring 47, thus freeing the control for releasing the locking means.

The aerodynamically operated safety device may be arranged to re-engage and re-lock the releasing control if and whenever the air-speed of the composite aircraft falls below the predetermined limit before the releasing control has been operated. Thus in the example shown in Fig. 5 if the air speed falls below the predetermined limit the spring 47 will cause the pin 44 to return to its operative position, provided the rod 46 has not been operated or has been returned to its initial position.

The aerodynamically operated safety device may take other forms and may employ mechanical, electrical or other means in its functioning. For instance instead of being actuated by a vane it may be actuated by an airscrew or windmill the speed of rotation of which will depend on the air-speed of the composite aircraft. When the predetermined air-speed is reached the airscrew or windmill will rotate at sufficient speed to release the locking pin by means of suitable centrifugal, electrical, hydraulic or pneumatic mechanism.

It will be understood that one such aerodynamically operated safety device may be arranged to control the release of more than one locking device, or to actuate directly a lock or locks securing the two components together. It will also be understood that more than one such aerodynamically operated safety device may be employed if desired.

Fig. 6 shows an example of means by which the engine or engines of the lower component are automatically throttled down and/or switched off as the upper component becomes detached from the lower component. The trip lever 49 is actuated by the axle 5 as it moves out of the socket 3. The trip lever is connected by means of rods, wires, etc., to the throttle controls and/or to the master switch control of the engine or engines of the lower component in such manner that the actuation of the trip lever by the axle as it moves out of the socket causes the engine or engines of the lower component to be throttled down and/or switched off. This arrangement will ensure that the engine or engines of the lower component are only thus automatically throttled down and/or switched off when the upper component has become separately airborne and has actually become detached from the lower component. The device will not restrict the pilot of the lower component from reopening the throttle or throttles and/or switching on the engine or engines as soon as the upper component is safely clear of the lower component. It will be understood that the automatic throttling down and/or switching off of the engine or engines of the lower component may be achieved by other means such as the breaking of an electric circuit by the axle as it leaves the socket.

Means similar to those described for the automatic throttling down and/or switching off of the engine or engines of the lower component may be employed for automatically bringing into play air brakes and/or a lift spoiling device on the lower component, or the same means may be employed for the actuation of any or all of these devices for accelerating the separation of the two components.

Guards to prevent undesirable relative movement of the upper component in relation to the lower component immediately after detachment may take the form of guides, posts or stops erected on the top plane hull or fuselage of the lower component. Such guards will only be required where there might otherwise be risk of fouling between parts of the two components, and are not shown in the particular case illustrated.

It will be understood that any of the locking, releasing or safety devices included in the invention may be actuated by mechanical means as described or alternatively by electrical hydraulic or pneumatic means.

What I claim as my invention and desire to secure by Letters Patent is:—

1. A composite aircraft comprising two component aircraft each capable of independent flight mounted one on top of the other, releasable locking means initially securing the two components together, a control associated with the upper component, and a control associated with the lower component, in which the aerodynamic relationship of the wings of the components is such that, as the composite aircraft accelerates, the lift on the wings of the upper component will automatically increase relatively to the lift on the wings of the lower component until, at a certain speed the separating force between the two components reaches a launching value sufficient to ensure safe separation of the two components on release of the locking means, and in which said releasable locking means comprise a member holding said two components in locked relation and operative connections between the said member and said controls which maintain the member in locking position until both controls have been actuated and then release it.

2. A composite aircraft comprising two component aircraft each capable of independent flight mounted one on top of the other, releasable locking means initially securing the two components together in which the aerodynamic relationship of the wings of the components is such that, as the composite aircraft accelerates, the lift on the wings of the upper component will automatically increase relatively to the lift on the wings of the lower component until, at a certain speed the separating force between the two components reaches a launching value sufficient to ensure safe separation of the two components on release of the locking means, and in which said releasable locking means comprise a member holding the two components in locked relation and means responsive to the separating force between the two components which maintains the member in locking position until said safe launching value has been reached and then releases it.

3. A composite aircraft comprising two component aircraft each capable of independent flight mounted one on top of the other, releasable locking means initially securing the two components together with the upper component initially set at a substantially larger angle of incidence than the lower component so that as the composite aircraft accelerates the lift on the wings of the upper component will automatically increase relatively to the lift on the wings of the lower component until, at a certain speed, the separating force between the two components reaches a launching value sufficient to ensure safe separation of the two components on release of the locking means, said releasable locking means comprising a member holding said two components in locked relation and means responsive to the separating force between said two components which maintains the member in locking position until said safe launching value has been reached and then releases it.

4. A composite aircraft comprising two component aircraft, each capable of independent flight, which are secured together by releasable locking means, the wings of the upper component having a substantially wider angular range between the angle of no lift and the angle of maximum lift than the corresponding angular range of the wings of the lower component, so that as the composite aircraft accelerates the lift on the wings of the upper component will automatically increase relatively to the lift on the wings of the lower component until, at a certain speed, the separating force between the two components reaches a launching value sufficient to ensure safe separation of the two components on release of the locking means, said releasable locking means comprising a member holding said two components in locked relation and means responsive to the separating force between said two components which maintains the member in locking position until said safe launching value has been reached and then releases it.

5. A composite aircraft according to claim 2, including constraining means which initially render inoperative at least one flying control of one of the components but are arranged to be released by the actuation of a control associated with the other component.

6. A composite aircraft according to claim 2, including constraining means which initially render inoperative at least one flying control of one of the components but are arranged to be released by the actuation of two controls of which one is associated with each of the components.

7. A composite aircraft according to claim 2, including constraining means which initially render inoperative at least one flying control of one of the components but are arranged to be released automatically on detachment of the upper component from the lower component.

8. A composite aircraft according to claim 2, including constraining means which initially render inoperative at least one flying control of one of the components but are arranged to be released automatically on release of the locking means securing the two components together.

9. A composite aircraft according to claim 2, wherein detachment of the upper component is dependent upon the final release of a single attachment between the two components.

10. A composite aircraft according to claim 2, wherein the releasable locking means comprise an overriding locking device which normally prevents the aforesaid automatic release of the separating-force-responsive locking member, and a control operable by the pilot of one of the components to free the overriding locking device and permit of automatic release of the said locking member when the separating force between the components reaches the safe launching value.

11. A composite aircraft according to claim 2, wherein the releasable locking means comprise an overriding locking device, which normally prevents the aforesaid automatic release of the separating-force-responsive locking member, a control associated with the upper component, a control associated with the lower component, and operative connections between the overriding locking device and said controls for freeing the overriding locking device when both the controls are actuated, in order to permit of automatic release of the said locking member when the separating force between the components reaches the safe launching value.

12. A composite aircraft according to claim 2, wherein the releasable locking means comprise a hook pivotally mounted on one component, a tension member associated with the other component and engaging with said hook, yielding means opposing turning movement of the hook about its pivot but arranged to permit of such turning movement as the tension in the tension member increases with the separating force between the components until, when said force reaches the safe launching valve, the tension member is freed from engagement with the hook, the two components being thus allowed to separate, a lock initially preventing turning movement of the hook about its pivot whatever the tension in the tension member, and a control which is operable to release the lock in order to permit the aforesaid turning movement of the hook to take place.

13. A composite aircraft according to claim 2, wherein the releasable locking means comprise a hook pivotally mounted on one component, a tension member associated with the other component and engaging with said hook, yielding means opposing turning movement of the hook about its pivot but arranged to permit of such turning movement as the tension in the tension member increases with the separating force between the components until, when the said separating force reaches the safe launching value, the tension member is freed from engagement with the hook, the two components being thus allowed to separate, a lock initially preventing turning movement of the hook about its pivot whatever the tension in the tension member, a control associated with one of the components for releasing the lock in order to permit such turning movement of the hook to take place, an overriding locking device which initially prevents actuation of said control, and a second control associated with the other component and operable to free the overriding locking device and permit the first mentioned control to be operated so as to release the aforesaid lock.

ROBERT HOBART MAYO.